United States Patent
Eres et al.

(10) Patent No.: US 9,298,460 B2
(45) Date of Patent: Mar. 29, 2016

(54) REGISTER MANAGEMENT IN AN EXTENDED PROCESSOR ARCHITECTURE

(75) Inventors: Revital Eres, Tel-Aviv (IL); Amit Golander, Tel-Aviv (IL); Nadav Levison, Moshav Herut (IL); Sagi Manole, Petach Tiqwa (IL); Ayal Zaks, Mitzpe Aviv (IL)

(73) Assignee: International Business Machines Corporation, Armonk, NY (US)

( * ) Notice: Subject to any disclaimer, the term of this patent is extended or adjusted under 35 U.S.C. 154(b) by 1021 days.

(21) Appl. No.: 13/305,760

(22) Filed: Nov. 29, 2011

(65) Prior Publication Data

US 2013/0138922 A1 May 30, 2013

(51) Int. Cl.
*G06F 9/30* (2006.01)
*G06F 9/38* (2006.01)

(52) U.S. Cl.
CPC ............ *G06F 9/30123* (2013.01); *G06F 9/384* (2013.01)

(58) Field of Classification Search
CPC ...................................................... G06F 9/384
See application file for complete search history.

(56) References Cited

U.S. PATENT DOCUMENTS

| | | | |
|---|---|---|---|
| 4,569,018 A * | 2/1986 | Hummel et al. | 711/207 |
| 5,564,031 A | 10/1996 | Amerson et al. | |
| 7,127,592 B2 | 10/2006 | Abraham et al. | |
| 7,823,033 B2 | 10/2010 | Moyer et al. | |
| 2004/0133766 A1 * | 7/2004 | Abraham et al. | 712/217 |
| 2006/0195707 A1 | 8/2006 | Rychlik | |
| 2011/0047533 A1 * | 2/2011 | Gschwind | 717/140 |

OTHER PUBLICATIONS

Kluge et al., "Building Adaptive Embedded Systems by Monitoring and Dynamic Loading of Application Modules", 2008, pp. 1-4.*
James David Balfour, "Efficient Embedded Computing", May 2010.
Dally et al., "Efficient embedded computing", IEEE Computer, 41(7):27-32, Jul. 2008.
Park et al., "Register pointer architecture for efficient embedded processors", in Date, Apr. 2007.
Sun Microsystems., "UtraSPARC Architecture 2007", Sun Microsystems, draft D0.9.3b edition, Oct. 2009.
Intel Corporation, "Intel Itanium Architecture Software Developer's Manual", Intel Corporation, Jan. 2006.
Kiyohara et al., "Register connection: a new approach to adding registers into instruction set architectures", in ISCA '93, Proceedings of the 20th Annual International Symposium on Computer Architecture, pp. 247-256, 1993.

(Continued)

*Primary Examiner* — John Lindlof
(74) *Attorney, Agent, or Firm* — Jinesh P. Patel; Gilad Mintzer-Magal

(57) ABSTRACT

Systems and methods are disclosed for enhancing the throughput of a processor by minimizing the number of transfers of data associated with data transfer between a register file and a memory stack. The register file used by a processor running an application is partitioned into a number of blocks. A subset of the blocks of the register file is defined in an application binary interface enabling the subset to be pre-allocated and exposed to the application binary interface. Optionally, blocks other than the subset are not exposed to the application binary interface so that the data relating to application function switch or a context switch is not transferred between the unexposed blocks and a memory stack.

17 Claims, 9 Drawing Sheets

(56) References Cited

OTHER PUBLICATIONS

Derby et al., "VICTORIA: VMX indirect compute technology oriented towards in-line acceleration", in CF '06 Proceedings of the 3rd conference on Computing frontiers, pp. 303-312, New York, NY, USA, 2006.

Nuzman et al., "Compiling for an indirect vector register architecture", in CF, 2008.

Moreno et al., "An innovative low-power high-performance programmable signal processor for digital communications", IBM Journal of Reseasrch and Development, 47(2-3):299-326, 2003.

* cited by examiner

```
main
    D2 = vsrf_malloc(1K registers)
    f1 (D1, D2, ...)
    D3 = vsrf_malloc(1K registers)
    f2 (D2, D3, ...)
    Free D2
    ...
    Free D3 f1 (in D1, out D2, ...)
    D1 = vsrf_malloc(1k registers)
    ..............
    free D1 f2 (in D2, out D3, ...)
    ..............
```

ND IN AN
EXTENDED PROCESSOR ARCHITECTURE

COPYRIGHT & TRADEMARK NOTICES

A portion of the disclosure of this patent document may contain material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of the applicant, the assignee, or third parties affiliated or unaffiliated with the applicant or the assignee. Use of these marks is for providing an enabling disclosure by way of example and shall not be construed to exclusively limit the scope of the disclosed subject matter to material associated with such marks.

TECHNICAL FIELD

The disclosed subject matter relates generally to managing data transfer, and more particularly to improving the efficiency of a processor by minimizing the delays associated with transfer of data between a register file and a memory stack.

BACKGROUND

A processor register is a high speed but limited capacity data storage medium, generally, embedded on a processor chip so that data stored in the register can be readily accessed by the processor. Due to the limited storage capacity of the on-chip registers, data is first stored in a slower but larger data storage medium commonly referred to as the main memory. Data is then loaded from the main memory into the processor registers, where it is manipulated by some machine instructions executed by the processor.

When a program code is executed by a processor, certain data values, represented by one or more variables, may be allocated to one or more processors registers. The allocation may be at local or global levels. If the allocation is local, the register is accessible only by the function or procedure for which the allocation is declared. If the allocation is global, the register is accessible by other functions or procedures as well. If the variables are not declared globally when a first function calls a second function, data in the locally allocated registers may have to be transferred from the registers to a memory stack and back.

The above process, commonly referred to as function switching, is associated with a lot of memory management overhead because registers with the values calculated by the first function call must transfer the respective values to the memory stack, so that the registers can be reallocated for use by the second function. Once the second function has completed execution, the registers need to be reallocated to the values used by the first function, as the control returns back to the first function for execution of the remaining instructions in the first function.

When a small number of registers are involved, the penalty associated with function switching does not significantly affect overall processing performance. In processor architectures that support large-scale register allocation, however, the corresponding penalty can impact the processor performance significantly, due to the large management overhead associated with the allocation, deallocation and reallocation of data among a large number of registers.

SUMMARY

For purposes of summarizing, certain aspects, advantages, and novel features have been described herein. It is to be understood that not all such advantages may be achieved in accordance with any one particular embodiment. Thus the disclosed subject matter may be embodied or carried out in a manner that achieves or optimizes one advantage or group of advantages without achieving all the advantages as may be taught or suggested herein.

In accordance with one embodiment, a method for enhancing the throughput of a processor by minimizing the number of data transfers between a register file and a memory stack is disclosed. The register file used by a processor running an application is logically partitioned into a number of blocks. A subset of the blocks of the register file is defined in an application binary interface enabling the subset of the blocks to be pre-allocated and exposed to the application binary interface. Blocks other than the subset are not exposed to the application binary interface so that the data relating to, for example, a function switch or a context switch are not transferred between the unexposed blocks and a memory stack. The unexposed blocks are allocated and de-allocated using an allocate instruction set and a de-allocate instruction set, respectively, in an instruction set architecture of the processor.

In accordance with an embodiment, a system comprising one or more logic units is provided. The one or more logic units are configured to perform the functions and operations associated with the above-disclosed methods. In yet another embodiment, a computer program product comprising a computer readable storage medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The disclosed subject matter is not, however, limited to any particular embodiment disclosed.

BRIEF DESCRIPTION OF THE DRAWINGS

The disclosed embodiments may be better understood by referring to the figures in the attached drawings, as provided below.

Features, elements, and aspects that are referenced by the same numerals in different figures represent the same, equivalent, or similar features, elements, or aspects, in accordance with an embodiment.

DETAILED DESCRIPTION OF EXEMPLARY EMBODIMENTS

In the following paragraphs, numerous specific details are set forth to provide a thorough description of various embodiments. Other embodiments may be practiced without these specific details or with some variations in detail. In some instances, some features are described in less detail so as not to obscure other aspects. The level of detail associated with each of the elements or features should not be construed to qualify the novelty or importance of one feature over the others.

Figure 1:
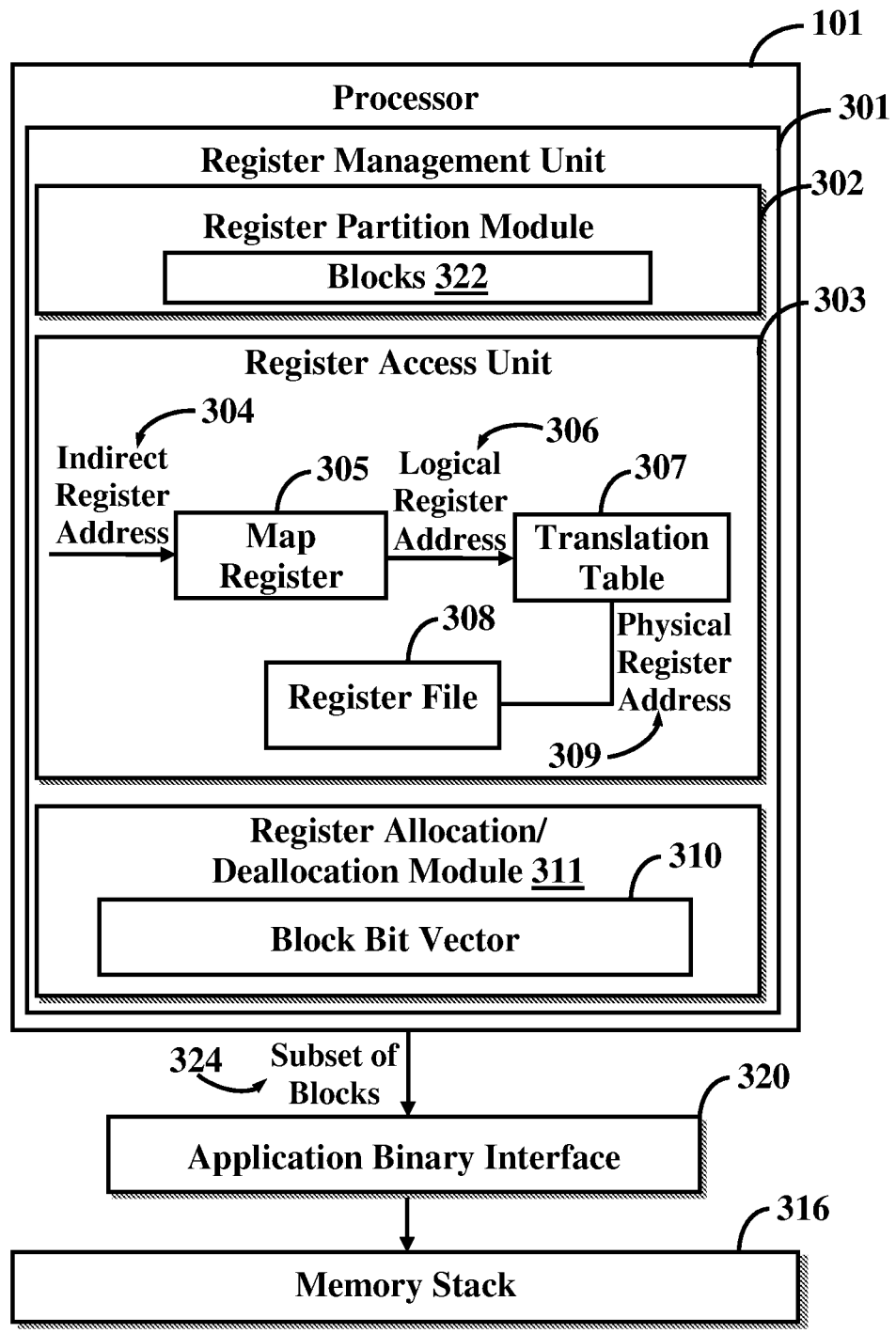
FIG. 1 illustrates a block diagram of a register management unit associated with a processor, in accordance with one embodiment.

Referring to FIG. 1, an exemplary block diagram of a register management unit 301 in operational relationship with a processor 101 is shown, in accordance with one embodiment. The processor 101, communicates with register management unit 301 to manage an array of processor registers associated with the processor 101. The registers may form a large register file 308 (e.g., a vector-scalar register file for storing vector and scalar data). In one embodiment, the register file 308, for example, includes 4,096 registers that may be divided into a plurality of blocks (e.g., 32 blocks), each block having a plurality of registers (e.g., 128 registers). Other embodiments may include any number of registers or blocks.

The register file 308 is a high speed storage structure that is used to temporarily store data used by the processor 101. The register management unit 301 may include a register partition module 302, a register access unit 303, and a register allocation/deallocation module 311 to allocate/deallocate data blocks. The partition module 302 may be used to partition the register file 308 used by the processor 101 into a plurality of registers in register file 308. A subset 324 of the blocks of the register file 308 may be defined in an application binary interface (ABI) 320.

A register address generated by the processor 101 is herein referred as a logical register address, and an address loaded into the memory is herein referred as a physical register address. The register access unit 303 may include a translation table (TT) 307 and a map register (MR) 305. The logical register address (LRA) 306 is translated to a physical register address (PRA) 309 using the translation table (TT) 307. In an embodiment, the register file 308 may be indirectly accessed via the map register (MR) 305 that maps an indirection register address (IRA) 304 to the logical register address (LRA) 306.

The map register (MR) 305 may be a software-controlled indirection mechanism that allows, for example, a 5-bit operand to address a 12-bit logical register address. In an example embodiment, 5-bit operands may support up to 32 registers. The indirection mechanism of the map register 305 enables the operands to access a larger number of registers (e.g., 4,096 registers). In exemplary embodiments, the indirection register address (IRA) 304 may be used to map a 5-bit operand map to the most significant bits (MSBs) representing a block address. The least significant bits (LSBs) of the logical register address (LRA) 306 may represent an offset within the blocks 322.

In one implementation, a physical block may be allocated via an allocate instruction set added to an instruction set architecture. The allocate instruction set may receive the number of registers to be allocated as input and may return a first logical register of an allocated set. A block bit vector (BBV) 310 for each block in the register file 308 indicates to the hardware whether the block is already allocated or available to be allocated.

An allocated physical block may be freed via a de-allocate instruction set added to the instruction set architecture. Note that, in an optional embodiment, the TT 307 and BBV 310 are not part of the ABI 320. The subset of blocks 324 is pre-allocated and is exposed to the ABI 320 such that the application won't allocate and free the subset of blocks 324. Other blocks that are not exposed to the ABI 320 are controlled by the application and there is no implicit flow of data between the unexposed blocks and a memory stack 316 as a result of a function switch or a context switch.

Figure 2:
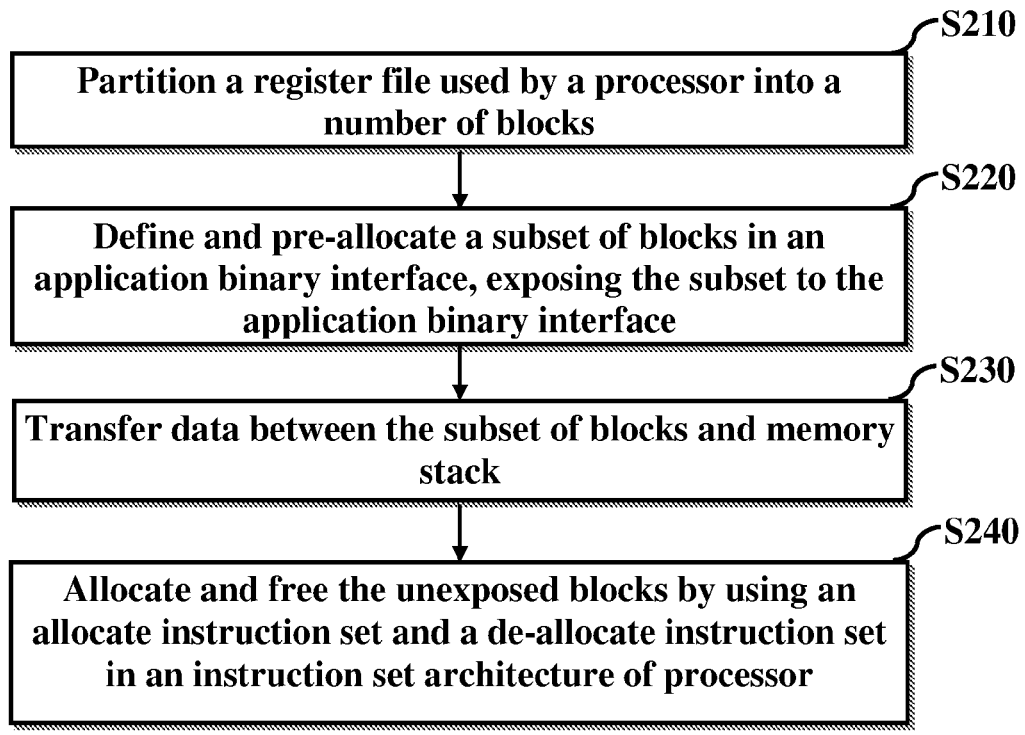
FIG. 2 shows a flow diagram of an exemplary process flow for improving the efficiency of a processor, in accordance with one embodiment.

Referring to FIGS. 1 and 2, a register file 308 used by the processor 101 may be logically partitioned into a number of blocks 322 (S210). A subset of blocks 324 of the register file 308 is defined in an ABI 320, such that the subset of blocks 324 is pre-allocated and exposed to the ABI 320 (S220). In an optional embodiment, the subset of blocks 324 may be exclusively allocated and exposed to the ABI 320 (e.g., blocks not included in the subset of blocks 324 are not pre-allocated).

In one implementation, the contents of the subset of blocks 324 are transferred to and from a memory stack 316 during an operation of the application (e.g., during a function switch) (S230). Optionally, said content transfer may be exclusive to the content stored in the subset of blocks 324 during a function switch. Blocks other than the subset 324 exposed to the ABI 320 may be allocated using an allocate instruction set and freed by using a de-allocate instruction set in an instruction set architecture of the processor 101 (S240).

As provided above, in one implementation, contents of blocks not included in the subset 324 are not transferred to or from the memory stack 316 during a function switch. As such, when the physical blocks allocated to a switched-off thread are freed, the contents of the register file 308 are transferred to memory 316. The transfer may be accomplished by, for example, resetting the valid bits in the TT 307 and the BBV 310. When the thread is switched back, the context switch procedure may reallocate as many physical blocks as required, and load the content, that was transferred from register file 308 to memory, back to the register file 308.

Figure 3:
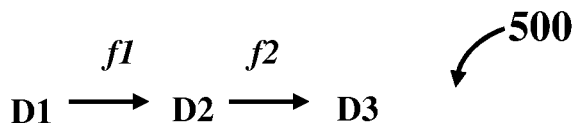
FIG. 3 shows an exemplary pseudo code of an application that uses chaining function, in accordance with one embodiment.

Referring to FIG. 3, an exemplary pseudo code 500 of a chaining function is shown, in accordance with one embodiment. D1, D2, and D3 represent data; f1 and f2 represent shelf (or any other) functions. The chaining function 500 involves transferring the contents of a current register set 324 to memory when both functions f1 and f2 are called and returned from.

Figure 4:
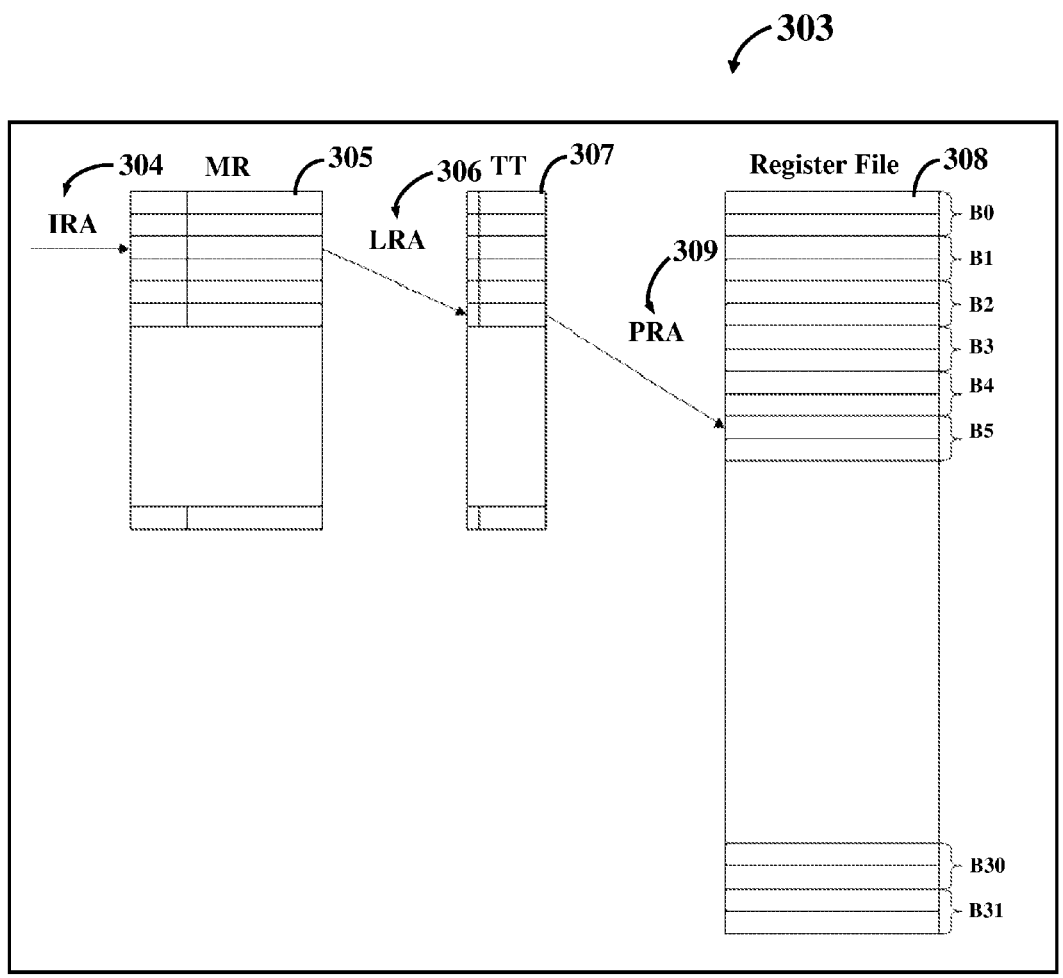
FIG. 4 illustrates a block diagram of an exemplary mode of accessing a register file, in accordance with one embodiment.

FIG. 4 is a block diagram showing an exemplary mode of accessing a register file 308, in accordance with one embodiment. In this exemplary embodiment, the register file 308 has 4K registers, assumed to be referenced by 12 bits. The register file 308 is accessed through the map register 305 (i.e., an indirection mechanism) that allows a 5 bit operand to address a 12 bit register file 308. The indirection is required to point to 4K registers through 5 bit operands, for example. In this embodiment, the register file 308 is partitioned into 128- register blocks (Bi), for example, Register access unit 303 is used to access the blocks. A logical register address 306 to a physical register address 308 translation is performed by a TT 307.

In one implementation, the physical blocks are allocated and de-allocated by instructions added to the instruction set architecture of the processor 101. An allocate instruction set (e.g., vsrf_malloc) receives the number of registers to be allocated (e.g., as aligned to block size) as an input and returns the first logical register of the allocated set (i.e., logically, not physically continuous). A de-allocate instruction set (e.g., vsrf_free) frees the logical set of blocks previously allocated. To allocate a vacant physical block, the hardware managed BBV 310 is used. The width of the BBV 310 is determined according to the size of the register file 308 and the number of blocks (i.e., 4K/128=32 in this example).

The register management unit 301 may map appropriate data elements of the source program and generate appropriate calls to an allocate instruction set and a de-allocate instruction set for allocation and de-allocation of the blocks 322. Programming-language extensions may extend the capabilities of a compiler by providing the programmer with the capabilities of the allocate instruction set and the de-allocate instruction set, with the help of the supporting compiler for the programming language. A compiler may be optimized by identifying opportunities of data reuse and prefetching, calling the allocate instruction set for allocation of register blocks, and calling the de-allocate instruction set for de-allocation of register blocks.

Figure 5:
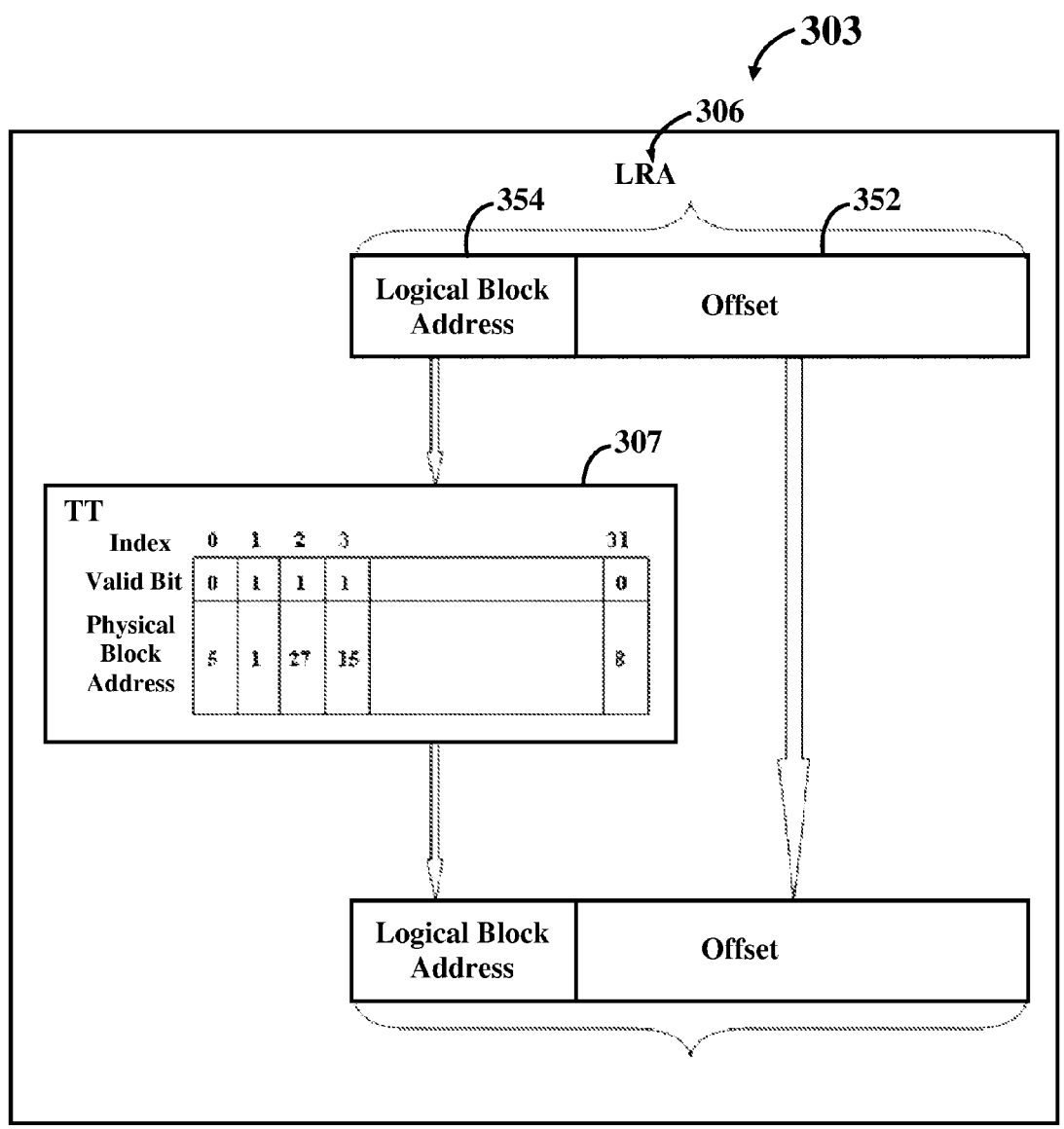
FIG. 5 illustrates a schematic block diagram of a logical to physical address translation process, in accordance with one embodiment.

FIG. 5 illustrates an exemplary schematic block diagram of the register access unit 303, in accordance with one embodiment. Each entry of the map register 305 is divided into the least significant bits (LSBs) that represent offsets 352 within a block and the most significant bits (MSBs) that represent a block address 354. In this example, addressing 32 blocks may be done by a 5 bit block address. When multi-threading is desired, a translation table 307 is used per thread, or the translation table 307 may be enhanced to receive the thread number as part of the input.

Figure 6:
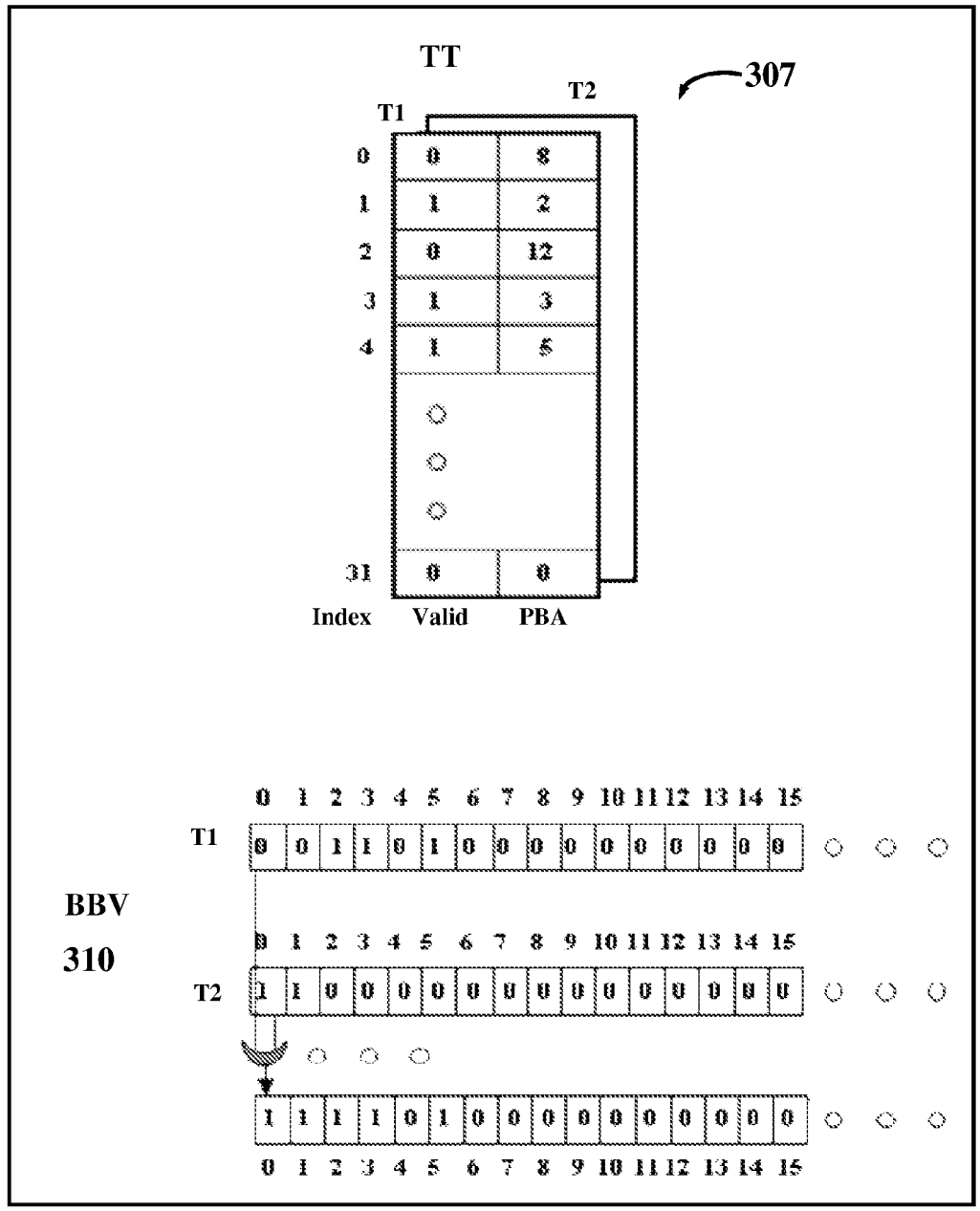
FIG. 6 illustrates an exemplary translation table and an exemplary block bit vector structure, in accordance with one embodiment.

FIG. 6 shows an exemplary translation table 307 and an exemplary block bit vector structure (BBV) 310 that is used for allocating blocks 322, in accordance with one embodiment. Upon calling an allocate instruction set (e.g., vsrf_malloc), the register management unit 301 searches for a non-set bit in the BBV 310, allocates the associated block and updates the related entry of the translation table 307, according to the LRA 306 received from a run-time environment. If no vacant block is found, an alert (e.g., an "out-of-blocks/registers" exception) is invoked, for example.

In the example embodiment illustrated in FIG. 6, the set bit is a bit in the block bit vector that is set to "1" and a non-set bit is a bit that is set to "0", for example. Bit i refers to any of the block bit vectors B0-B31 in this example embodiment. If bit i in the block bit vector 310 is set, then the physical Bi is allocated. When multi-threading is desired, a BBV is required per core and a bit-wise BBV (aggregated for all threads) is used. Upon calling a de-allocate instruction set (e.g., vsrf_free), the relevant entries of the translation table 307 and the BBV 310 associated bit are invalidated.

An allocate library function accepts the number of blocks to be allocated as input, and searches for continuous bits in the BBV 310. For example, to allocate 8 blocks, the allocate library function searches for 8 continuous bits in the BBV 310. If 8 continuous bits exist, the allocate library function may be called 8 times for allocating the 8 blocks and provide the first logical register per block. If 8 continuous bits do not exist, a reallocation instruction set may be called to perform compacting/defragmenting of the logical register and the physical register. A de-allocate library function frees one or more of the blocks within a pre-allocated region (e.g., 8 blocks) if a logical register address representing the start of the pre-allocated logical region is provided. An allocate library function may go over the BBV 310 for each thread.

A reallocation instruction set is added to the instruction set architecture to permit compacting/defragmenting of the logical register and the physical register without copying the contents of the registers to a memory stack. For example, consider that a program allocates four 128-register blocks (128-255, 256-383, 384-511 and 512-639) and then frees up the first and third ones (128-255 and 384-511). This causes two single-block-size holes in the logical enumeration.

At some point in time, software may need to allocate a continuous space that is larger than the biggest hole left and overrun the register logical enumeration (e.g., 4K in this example) which may be solved by spilling or compacting the logical registers. The compacting or defragmenting may be performed without copying by changing a pointer. The reallocation instruction set receives two logical registers and the register management unit 301 copies the entry of the translation table 307 of the first to the latter, while invalidating the first and checking that this is not a repeating allocation attempt.

An exemplary assembly code for allocating and de-allocating the blocks 322 is provided below. According to this exemplary code, the compiler/program calls a library function (e.g., VSRFlib_malloc), which returns the logical address 306 representing start of the vacant block and requires the number of registers to be allocated as input. The library function uses (but is different from) the allocate instruction set that is part of the instruction set architecture (ISA).

```
.file       "try1.c"
.section    ."text"
.align 2
.globl doit
.type doit, @function
foo:
    mr 12,1
    addi 1,1,-64
    stw 12,0(1(
    mflr 0
    stw 31,60(1)
    stw 0,68(1)
    li 3,256
    crxor 6,6,6
    bl vsrf_malloc
    /* the returned address is at the first element in VSRF[3];
    move it to register 66 */
    setmr 0,8
    setmr 4,0
    setmr 8,0
    vor 2,3,3
    li 3,256
    crxor 6,6,6
    bl vsrf_malloc
        /* the returned address is at the first element in VSRF[3];
    move it to register 67 */
    setmr 0,8
    setmr 4,0
    setmr 8,0
    vor 3,3,3
    ...
    lis 9,.LC0@ha
    la 9,.LC0@l(9)
    lvx 9,0,9
    li 9,0
    li 0,256
```

```
        setmnr 12,8 /* set map 12 to point to 64 */
        mtmnr 4,2 /* move VSRF[66] to map register 8 */
        mtmnr 0,3 /* move VSRF[66] to map register 9 */
        mtctr 0
        setmnr 13,2 /* map register 13 is [16,17,18,19,20,21,22,23]
    .L2:
        vaddfp 0,0,1
        incrmrh 0,13,0 /* increment map register 0 with 16 */
        incrmrh 4,13,0 /* increment map register 0 with 16 */
        addi 9,9,1
        bdnz .L2
        ...
        lwz 0,68(1)
        mtlr 0
        lwz 31,60(1)
        addi 1,1,64
        blr
        .size foo,.-foo
        .section        .rodata.cst16,"aM",@progbits,16
        .align 4
```

A used block instruction set may be added to the instruction set architecture to monitor and return the number of physical registers that are allocated per thread during runtime. The number of allocated registers may be monitored in runtime by adding a BBV counter per BBV 310. The BBV counter is incremented/decremented if the block is allocated/freed. The BBV counter is then multiplied by the size of each block.

Figure 7:
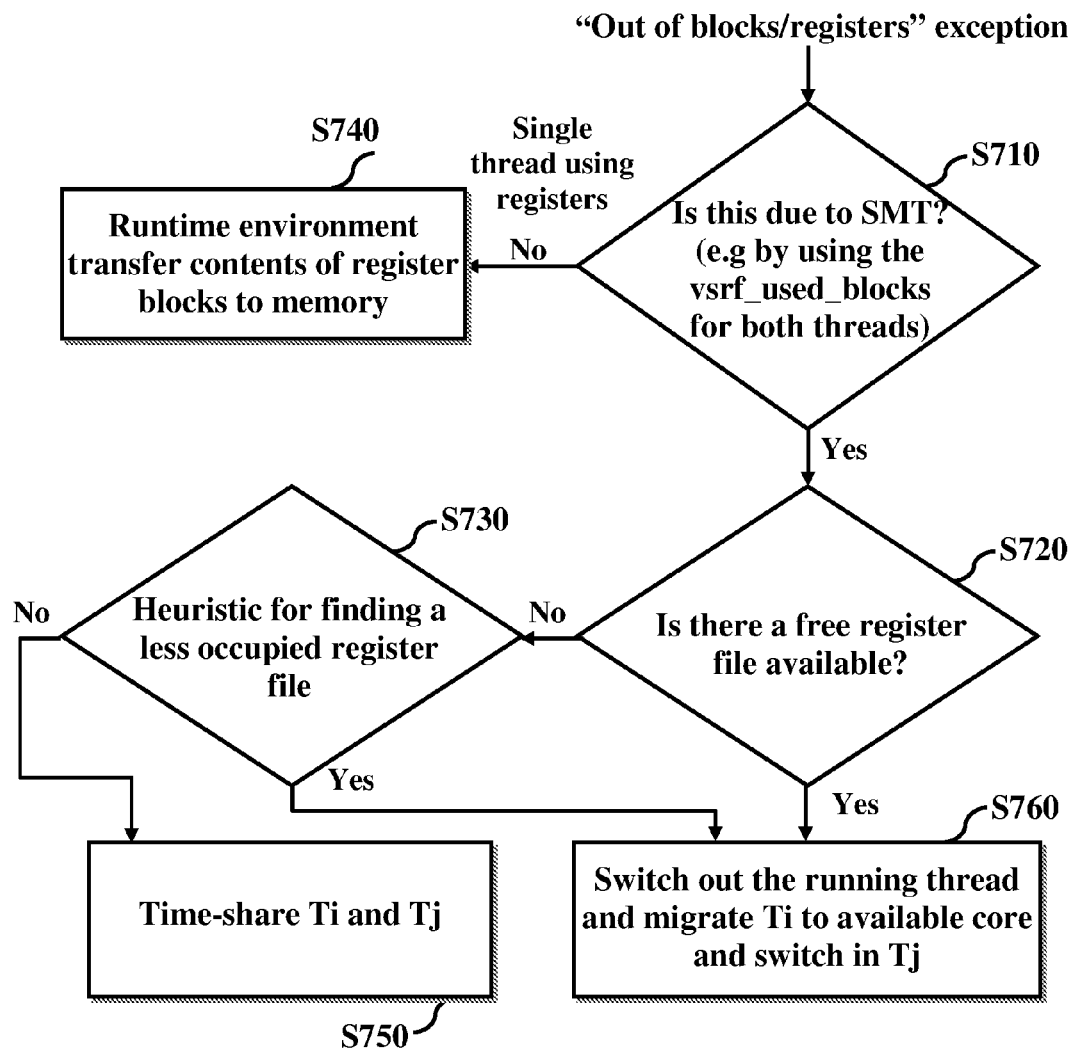
FIG. 7 is a flow diagram of an exemplary method for handling an "out of blocks/registers" exception, in accordance with one embodiment.

FIG. 7 is a flow diagram of an exemplary method for handling failure of the register allocation process when the above-mentioned alert (e.g., an out of blocks/registers exception) is generated. The out of blocks/registers exception could be either due to simultaneous multithreading (SMT) or because a single thread is using more than a predefined number (e.g., all) of the registers. A used block instruction set may be employed to determine if the out-of-register exception is due to (SMT).

SMT permits multiple independent threads of execution to better use the resources provided by the processor 101. If the out of blocks/registers exception is due to a single thread using all the registers, then the runtime environment may transfer the contents of register blocks 322 to a memory 316 (S740). If, however, the out of blocks/registers exception is due to SMT (S710), then further checking may be done to determine if a free register file is available (S720).

If a free register file is available (S720) then the running thread may be switched out, a first thread (e.g., Ti) may be migrated to available core, and a second thread (e.g., Tj) may be switched in (S760). If, however, a free register file is not available, then it is further determined whether there is a heuristic for finding a less occupied register file (S730). If there is a heuristic for finding a less occupied register file, then the running thread may be switched out, Ti may be migrated to available core, and Tj may be switched in (S760). If there is no heuristic for finding a less occupied register file, then a timeshare between the threads Ti and Tj may be established (S750).

Figure 8:
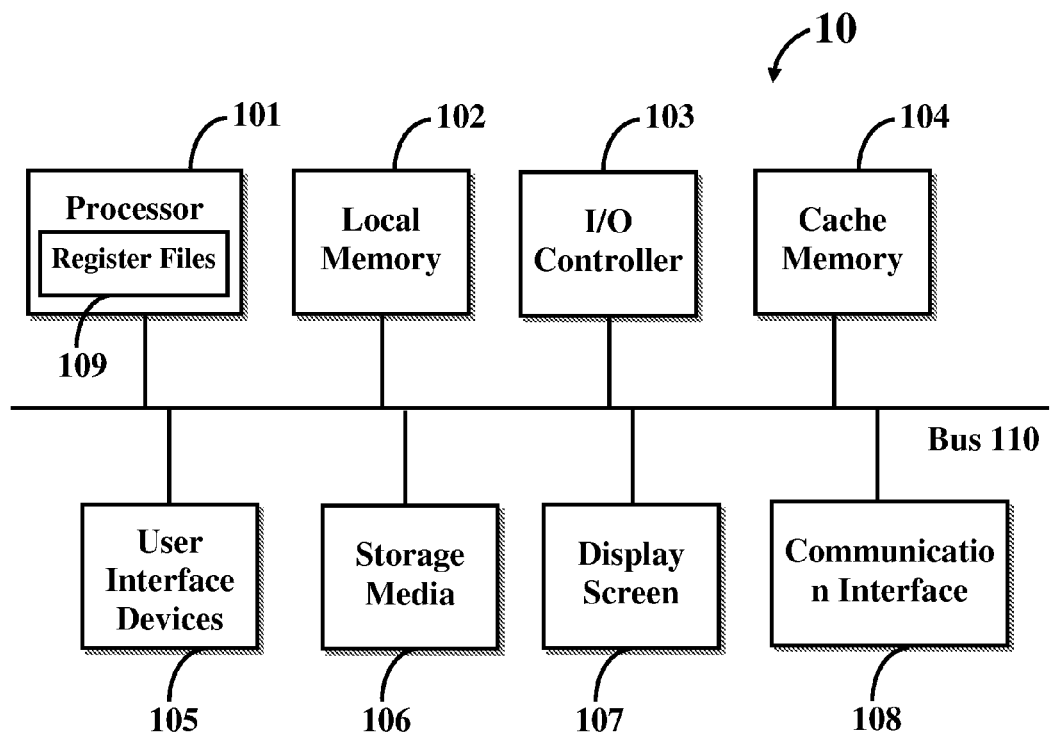
FIG. 8 shows an exemplary block diagram of a hardware environment in which the disclosed systems and methods may operate, in accordance with one embodiment.

Referring to FIG. 8, a computing environment in accordance with an exemplary embodiment may be composed of a hardware environment 100 and a software environment 120. The hardware environment 100 may comprise logic units, circuits, or other machinery and equipment that provide an execution environment for the components of software environment 120. In turn, the software environment 120 may provide the execution instructions, including the underlying operational settings and configurations, for the various components of the hardware environment 100.

Application software and logic code disclosed herein may be implemented in the form of computer readable code executed over one or more computing systems represented by the exemplary hardware environment 100. As illustrated, the hardware environment 100 may comprise a processor 101 coupled to one or more storage elements by way of a system bus 110. The processor 101 may include one or more register files 109 to hold the data the processor 101 is currently working on.

The processor 101 may include one or more register files to maintain data or instructions relatively close to the processor 101 core. The storage elements in which the data is stored, for example, may comprise local memory 102, storage media 106, cache memory 104 or other computer-usable or computer readable media. Within the context of this disclosure, a computer usable or computer readable storage medium may include any recordable article that may be used to contain, store, communicate, propagate or transport program code.

A computer readable storage medium may be an electronic, magnetic, optical, electromagnetic, infrared, or semiconductor medium, system, apparatus or device. The computer readable storage medium may also be implemented in a propagation medium, without limitation, to the extent that such implementation is deemed statutory subject matter. Examples of a computer readable storage medium may include a semiconductor or solid-state memory, magnetic tape, a removable computer diskette, a random access memory (RAM), a read-only memory (ROM), a rigid magnetic disk, an optical disk, or a carrier wave, where appropriate. Current examples of optical disks include compact disk, read only memory (CD-ROM), compact disk read/write (CD-R/W), digital video disk (DVD), high definition video disk (HD-DVD) or Blue-Ray™ disk.

In one embodiment, processor 101 loads executable code from storage media 106 to local memory 102. Cache memory 104 optimizes processing time by providing temporary storage that helps to reduce the number of times the code is loaded for execution. One or more user interface devices 105 (e.g., keyboard, pointing device, etc.) and a display screen 107 may be coupled to the other elements in the hardware environment 100 either directly or through an intervening I/O controller 103, for example. A communication interface unit 108, such as a network adapter, may be provided to enable the hardware environment 100 to communicate with local or remotely located computing systems, printers and storage devices via intervening private or public networks (e.g., the Internet). Wired or wireless modems and Ethernet cards are a few of the exemplary types of network adapters.

It is noteworthy that the hardware environment 100, in certain implementations, may not include some or all the above components, or may comprise additional components to provide supplemental functionality or utility. Depending on the contemplated use and configuration, hardware environment 100 may be a desktop or a laptop computer, or other computing device optionally embodied in an embedded system such as a set-top box, a personal digital assistant (PDA), a personal media player, a mobile communication unit (e.g., a wireless phone), or other similar hardware platforms that have information processing or data storage capabilities.

In some embodiments, the communication interface 108 acts as a data communication port to provide means of communication with one or more computing systems by sending and receiving digital, electrical, electromagnetic or optical signals that carry analog or digital data streams representing various types of information, including program code. The communication may be established by way of a local or a remote network, or alternatively by way of transmission over the air or other medium, including without limitation propagation over a carrier wave.

As provided here, the disclosed software elements that are executed on the illustrated hardware elements are defined according to logical or functional relationships that are exemplary in nature. It should be noted, however, that the respective methods that are implemented by way of said exemplary software elements may be also encoded in said hardware elements by way of configured and programmed processors, application specific integrated circuits (ASICs), field programmable gate arrays (FPGAs) and digital signal processors (DSPs), for example.

Figure 9:
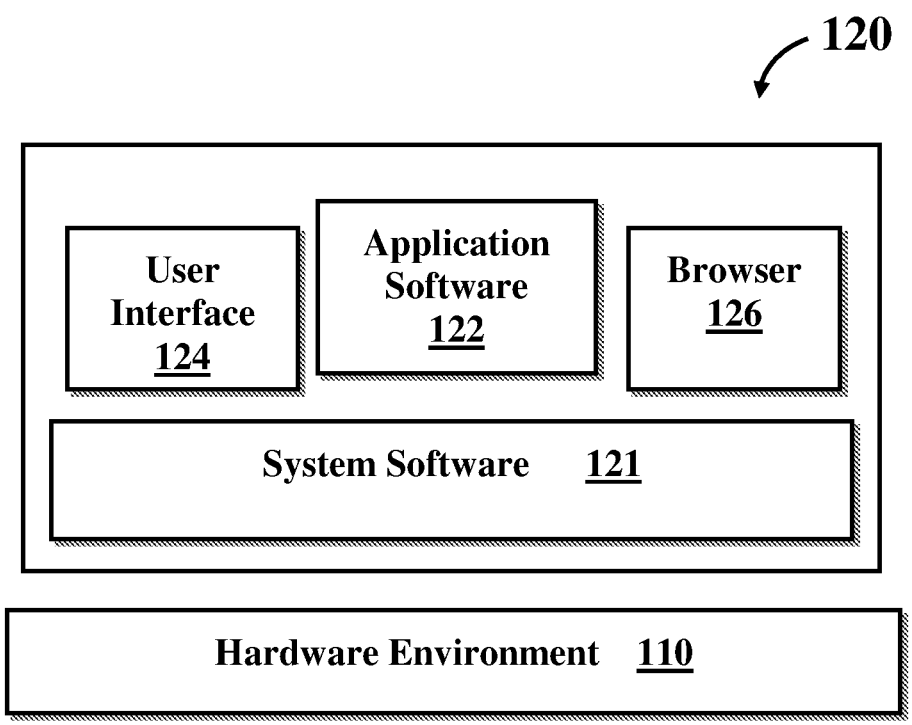
FIG. 9 shows a block diagram of an exemplary software environment in which the disclosed systems and methods may operate, in accordance with one embodiment.

Referring to FIG. 9, a software environment 120 may be generally divided into two classes comprising system software 121 and application software 122 as executed on one or more hardware environments 100. In one embodiment, the methods and processes disclosed here may be implemented as system software 121, application software 122, or a combination thereof. System software 121 may comprise control programs, such as an operating system (OS) or an information management system, that instruct one or more processors 101 (e.g., microcontrollers) in the hardware environment 110 on how to function and process information. Application software 122 may comprise but is not limited to program code, data structures, firmware, resident software, microcode or any other form of information or routine that may be read, analyzed, or executed by a processor 101.

In other words, the application software 122 may be implemented as program code embedded in a computer program product in the form of a computer-usable or computer readable storage medium that provides program code for use by, or in connection with, a computer or any instruction execution system. Moreover, the application software 122 may comprise one or more computer programs that are executed on top of system software 121 after being loaded from the storage media 106 into the local memory 102. In client-server architecture, the application software 122 may comprise client software and server software. For example, in one embodiment, client software may be executed on a client computing system that is distinct and separable from a server computing system on which server software is executed.

Software environment 120 may also comprise browser software 126 for accessing data available over local or remote computing networks. Further, the software environment 120 may comprise a user interface 124 (e.g., a graphical user interface (GUI)) for receiving user commands and data). It is worthy to repeat that the hardware and software architectures and environments described above are for purposes of example. As such, an embodiment may be implemented over any type of system architecture, functional or logical platform or processing environment.

It should also be understood that the logic code, programs, modules, processes, methods, and the order in which the respective processes of each method are performed are purely exemplary. Depending on implementation, the processes or any underlying sub-processes and methods may be performed in any order or concurrently, unless indicated otherwise in the present disclosure. Further, unless stated otherwise with specificity, the definition of logic code within the context of this disclosure is not related or limited to any particular programming language, and may comprise one or more modules that may be executed on one or more processors in distributed, non-distributed, single, or multiprocessing environments.

As will be appreciated by one skilled in the art, a software embodiment may include firmware, resident software, microcode, etc. Certain components including software or hardware or combining software and hardware aspects may generally be referred to herein as a "circuit," "module" or "system." Furthermore, the subject matter disclosed may be implemented as a computer program product embodied in one or more computer readable storage medium(s) having computer readable program code embodied thereon. Any combination of one or more computer readable storage medium(s) may be used. The computer readable storage medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

In the context of this document, a computer readable storage medium may be any tangible medium that may contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that may communicate, propagate, or transport a program for use by or in connection with an instruction execution system, apparatus, or device.

Program code embodied on a computer readable storage medium may be transmitted using any appropriate medium, including but not limited to wireless, wireline, optical fiber cable, RF, etc., or any suitable combination of the foregoing. Computer program code for carrying out the disclosed operations may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Certain embodiments are disclosed with reference to flowchart illustrations and/or block diagrams of methods, apparatus (systems) and computer program products according to embodiments. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that may direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The claimed subject matter has been provided here with reference to one or more features or embodiments. Those skilled in the art will recognize and appreciate that, despite the detailed nature of the exemplary embodiments provided, changes and modifications may be applied to said embodiments without limiting or departing from the generally intended scope. These and various other adaptations and combinations of the embodiments provided here are within the scope of the disclosed subject matter as defined by the claims and their full set of equivalents.

What is claimed is:

1. A computer-implemented method for enhancing the throughput of a processor, comprising:
   logically partitioning a register file used by a processor into a plurality of blocks, each block having a plurality of registers;
   defining, in an application binary interface (ABI), a subset of the blocks of the register file to pre-allocate and expose the subset to the ABI;
   preventing exposure of blocks other than those in the subset to the ABI, so that data is not transferred between the unexposed blocks and a memory upon function and context switches; and
   allocating blocks, using an allocate instruction set, wherein prior to allocation, the allocated blocks were unexposed to the ABI, and wherein allocating block further comprises:
   determining whether a continuous number of bits equal to a number of blocks to be allocated exist in a block bit vector;
   based on determining that the continuous number of bits exist, calling an allocate library function an amount of times equal to the continuous number of blocks that exist; and
   based on determining that the continuous number of bits do not exist, utilizing a reallocation instruction set to perform at least one of compacting and defragmenting of a logical register and a physical register.

2. The method of claim 1 further comprising:
   de-allocating the unexposed blocks using a de-allocate instruction set in an instruction set architecture of the processor.

3. The method of claim 2, wherein the allocating comprises:
   receiving a logical register address representing start of a vacant logical region in a run-time environment; and
   mapping the logical register address to a physical register address in a translation table.

4. The method of claim 3, further comprising indirectly accessing the register file via a map register to map an indirection register address to the logical register address.

5. The method of claim 3, further comprising searching for an indicator in a block bit vector to allocate a vacant block, wherein the indicator indicates that the corresponding block is vacant.

6. The method of claim 3, further comprising invoking an out-of-register exception, if no vacant block is detected.

7. The method of claim 6, wherein invoking the exception comprises writing a block from the register file to the memory, if a single thread uses the register file.

8. The method of claim 6, wherein invoking the exception further comprises:
   migrating a thread to a target core having a less occupied register file to free blocks in a source core; and
   allocating a new block on the target core, if at least two threads are available.

9. The method of claim 6, wherein invoking the exception further comprises implementing a time-sharing solution to run at least two threads on the register file, if other register files are occupied completely.

10. The method of claim 3, further comprising using a reallocation instruction set in the instruction set architecture to compact or de-fragment a logical register address space by changing a pointer to the register file, obviating the need for copying the register contents.

11. A system for enhancing the throughput of a processor, comprising:
    a register partitioner for logically partitioning a register file used by a processor into a plurality of blocks, each block having a plurality of registers;
    a subset of the blocks of the register file defined in an application binary interface (ABI) enabling one or more blocks in the subset to be pre-allocated and exposed to the ABI; and
    a register management unit comprising an allocation/de-allocation unit for allocating and de-allocating one or more blocks in the register file that are unexposed, using an allocate instruction set and a de-allocate instruction set in an instruction set architecture of the processor, wherein prior to allocation, the allocated one or more blocks were unexposed to the ABI, and wherein the allocation/de-allocation unit:
    determines whether a continuous number of bits equal to a number of blocks to be allocated exist in a block bit vector;

based on determining that the continuous number of bits exist, calls an allocate library function an amount of times equal to the continuous number of blocks that exist; and based on determining that the continuous number of bits do not exist, utilizes a reallocation instruction set to perform at least one of compacting and defragmenting of a logical register and a physical register.

12. The system of claim 11, wherein the register management unit further comprises a translation table that maps logical register addresses to physical register addresses.

13. The system of claim 12, wherein the register management unit further comprises a map register that maps indirection register addresses to the logical register addresses.

14. The system of claim 11, further comprising a logic unit for searching a non-set bit in a block bit vector to allocate a vacant block.

15. The system of claim 12, further comprising a reallocation instruction set in the instruction set architecture to compact/de-fragment a logical register address space by changing a pointer to the register file, obviating the need for copying the contents of the registers.

16. The system of claim 12, wherein an out-of-register exception is invoked, if no vacant block is detected.

17. The system of claim 16, wherein in response to the out-of-register exception, the register management unit:

writes a block from the register file to a memory if a single thread uses the register file;

migrates a thread to a target core having a less occupied register file to free blocks in a source core and allocating a new block on the target core, if at least two threads are available; or implements a time-sharing solution to run the at least two threads on the register file if other register files are occupied completely.

* * * * *